United States Patent [19]
Breads

[11] 4,064,708
[45] Dec. 27, 1977

[54] COUPLING FOR CONNECTING A ROTATING MEMBER TO A SHAFT

[75] Inventor: Eugene H. Breads, Westfield, N.Y.

[73] Assignee: Renold Ajax Inc., Westfield, N.Y.

[21] Appl. No.: 686,128

[22] Filed: May 13, 1976

[51] Int. Cl.² .......................... B25G 3/00; B25G 3/20
[52] U.S. Cl. ....................................... 64/1 V; 403/369
[58] Field of Search ..................... 64/9 R, 7, 6, 4; 403/368, 369, 374, 358

[56] References Cited
U.S. PATENT DOCUMENTS

| | | | |
|---|---|---|---|
| 3,327,497 | 6/1967 | Amend et al. | 403/369 |
| 3,702,200 | 11/1972 | Carman | 403/369 |
| 3,957,381 | 3/1976 | Schafer | 403/369 |
| 3,990,804 | 11/1976 | Peter et al. | 403/374 |

Primary Examiner—Samuel Scott
Assistant Examiner—R. C. Turner
Attorney, Agent, or Firm—Charles L. Lovercheck

[57] ABSTRACT

A coupling for connecting a rotating member to a shaft. The shaft has two flat, diametrically-opposite, axially-extending flat surfaces. Keys at an outer surface taper inwardly in opposite directions. A spring on the large end of each key urges the key to slide toward the shaft and in opposite direction so that the shaft is always held against vibration.

6 Claims, 2 Drawing Figures

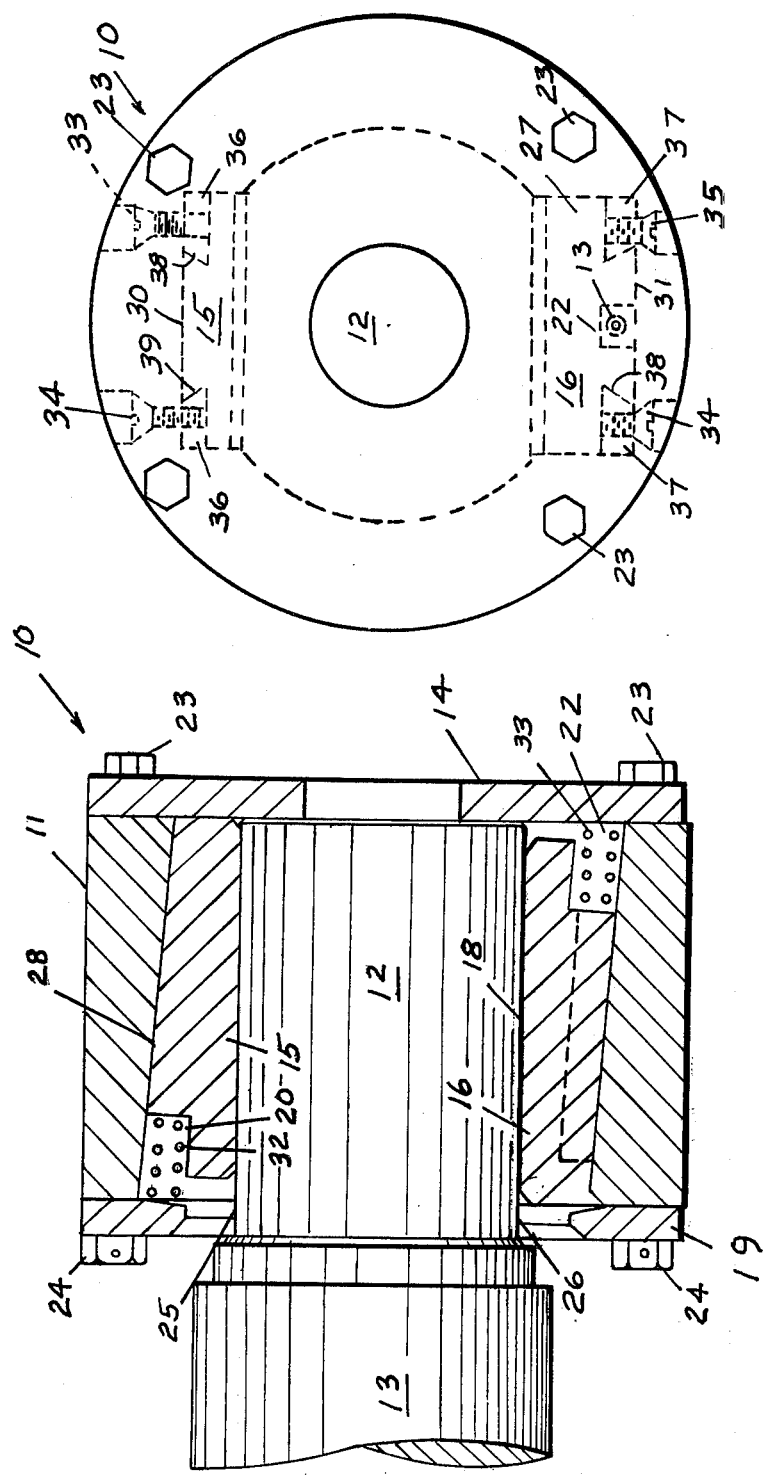

COUPLING FOR CONNECTING A ROTATING MEMBER TO A SHAFT

REFERENCE TO PRIOR ART

The coupling herein constitutes an improvement over the coupling shown in U.S. Pat. Nos. 3,702,200; 3,222,884; 3,752,430; and 3,327,497.

OBJECTS OF THE INVENTION

It is an object of the invention to provide an improved coupling.

Another object of the invention is to provide a coupling that is simple in construction, economical to manufacture and simple and efficient to use.

Another object of the invention is to provide a coupling that will reduce play between a coupling and a shaft when installed but will produce ample clearance between members when shaft is moved axially in relation to the coupling for ease of assembly or disassembly.

Another object of the invention is to provide a method of clamping a shaft in a coupling to support a predetermined amount of axial thrust but allow axial movement between members when said thrust is exceeded.

With the above and other objects in view, the present invention consists of the combination and arrangement of parts hereinafter more fully described, illustrated in the accompanying drawing and more particularly pointed out in the appended claims, it being understood that changes may be made if the form, size, proportions and minor details of construction without departing from the spirit or sacrificing any of the advantages of the invention.

GENERAL DESCRIPTION OF THE DRAWINGS

FIG. 1 is a longitudinal, cross-sectional view taken on Line 1—1 of FIG. 2 of the coupling according to the invention.

FIG. 2 is an end view of the coupling.

DETAILED DESCRIPTION OF THE DRAWINGS

Now, with more particular reference to the drawings, coupling 10 shows a generally cylindrical sleeve 11 for connecting to a rotating member or to a shaft. The coupling 10 is generally cylindrical in configuration, has two flat ends and is made up of sleeve 11 which has an outer cylindrical surface and an axial bore 12 therein. A shaft 13 is received in the axial bore 12. A thrust plate 14 is attached to one end of the coupling 10 by means of studs 23. The other end of the coupling has the retaining ring 19 attached to the coupling body by studs 24.

Shaft 13 has two flat, axially-extending, diametrically-disposed surfaces 25 and 26 on which the inner flat surfaces 17 and 18 of keys 15 and 16 respectively rest.

The sleeve 11 has slots 27 and 28 formed therein. Keyways 30 and 31 are tapered toward the shaft 13 and toward the thrust plate 14 and receive the keys 15 and 16.

Gibs 36 and 37 are received in slots 27 and provide the dovetail shape for the keyways 30 and 31. Gibs 36 and 37 are held in position by screws 34 and 35 which extend through countersunk holes in the outside of sleeve 11.

Key 15 has an axial bore 20 therein and the compression spring 32 is supported in the axial bore 20. Spring 32 rests against retaining ring 19 and urges key 15 toward the thrust plate 14. Keys 15 and 16 are wedge-shaped and fit snugly in the keyways 30 and 31.

Key 16 has a bore 22 therein and spring 33 is supported in the bore 22 and the outer end of compression spring 33 rests against thrust plate 14, urging the key 16 in axial direction toward the shaft 13.

The outer surface of key 15 has a dovetailed outer surface 38 and key 16 has a similar dovetailed surface 39.

It will be noted that, when an effort is made to remove the shaft 13, key 15 will tend to compress the springs 32 and allow the shaft to be easily removed. The springs 32 and 33 urge the keys to slide toward the center of the shaft so that all torsional forces on the keys will find little or no play between the shaft and the coupling.

The foregoing specification sets forth the invention in its preferred practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. A coupling comprising, a sleeve adapted to connect a rotating member to a shaft,
    said sleeve having an axial bore therein,
    said axial bore receiving an end of said shaft,
    a thrust plate attached to an end of said sleeve remote from said shaft,
    at least two circumferentially-spaced keyways in said coupling extending through said sleeve from one end thereof to the other end,
    a wedge-shaped key in each said keyway,
    said shaft having two diametrically-opposed, axially-extending surfaces thereon,
    surfaces of said keys adjacent said shaft slidably engaging said surfaces of said shaft,
    said keyways being deeper at the ends thereof adjacent said springs whereby said wedge-shaped keys are urged toward the shallower end of said keyways,
    a retaining ring fixed to the end of said coupling adjacent said shaft, and a thrust plate fixed to the end of said sleeve opposite said retaining ring,
    a bore in said first key,
    a spring in said bore in said first key engaging said retaining ring, urging said first key to slide toward said thrust ring,
    a second bore in the end of said second key adjacent said thrust ring,
    a second spring in said second bore,
    said second spring engaging said first key and said thrust ring, urging said second key to slide toward said retaining ring whereby said first key and said second key are urged in opposite directions by said springs and toward the center of said shaft.

2. The coupling recited in claim 1 wherein said surfaces on said shaft are flat and generally parallel to each other.

3. The coupling recited in claim 2 wherein two spaced gibs are provided for each said keyway,
    each said gib being fixed to said coupling at one side of said keyway,
    said gibs each having a surface inclined toward the center of said shaft and inwardly, and a dovetail surface on each said key receiving said inwardly-inclined surface, whereby said keys are slidably supported on said surfaces.

4. The coupling recited in claim 1 wherein said coupling is adapted to be connected to a driving member at the end thereof adjacent said thrust ring.

5. The coupling recited in claim 1 wherein said keys each have a dovetailed outer surface and a complimentary-shaped surface defining said keyway receiving said dovetailed keyway surfaces.

6. The coupling recited in claim 1 wherein said dovetailed surfaces defining said keyways are formed by gibs supported on said coupling.

* * * * *